(12) United States Patent
Fryshman

(10) Patent No.: US 10,251,478 B2
(45) Date of Patent: Apr. 9, 2019

(54) ADJUSTABLE SURFACE EXTENDER

(71) Applicant: Bernard Fryshman, Brooklyn, NY (US)

(72) Inventor: Bernard Fryshman, Brooklyn, NY (US)

(*) Notice: Subject to any disclaimer, the term of this patent is extended or adjusted under 35 U.S.C. 154(b) by 0 days.

(21) Appl. No.: 15/597,751

(22) Filed: May 17, 2017

(65) Prior Publication Data

US 2018/0055217 A1 Mar. 1, 2018

Related U.S. Application Data

(60) Provisional application No. 62/482,989, filed on Apr. 7, 2017, provisional application No. 62/382,677, filed on Sep. 1, 2016.

(51) Int. Cl.
| | |
|---|---|
| *A47B 1/05* | (2006.01) |
| *A47B 23/04* | (2006.01) |
| *F16M 13/02* | (2006.01) |
| *A47B 96/02* | (2006.01) |

(52) U.S. Cl.
CPC .............. *A47B 23/043* (2013.01); *A47B 1/05* (2013.01); *A47B 96/02* (2013.01); *F16M 13/022* (2013.01); *F16M 2200/024* (2013.01)

(58) Field of Classification Search
CPC ............ F16M 13/022; F16M 2200/024; A47B 23/043; A47B 1/04; A47B 96/02; A47B 96/022; A47B 96/061; A47B 23/02; A47B 87/002; A47B 87/007; F16B 2/12
USPC .... 248/447.2, 454, 457, 458, 460, 447, 444, 248/229.14, 229.11, 229.16, 229.12, 248/229.22, 231.61; 108/42, 46, 152, 108/69.73, 90, 64, 185
See application file for complete search history.

(56) References Cited

U.S. PATENT DOCUMENTS

| | | | |
|---|---|---|---|
| 387,040 A | 7/1888 | Blake | |
| 937,639 A | 10/1909 | Paulsen | |
| 1,108,692 A | 8/1914 | Burd | |
| 2,709,563 A | 5/1955 | Starkey | |
| 2,941,557 A * | 6/1960 | Baprawski | B25B 5/003 269/246 |
| 3,289,615 A | 12/1966 | Marschak | |
| 3,301,406 A | 1/1967 | Scott | |
| 3,408,032 A * | 10/1968 | Francis | A47B 23/007 248/447.1 |
| 3,741,131 A * | 6/1973 | Leadbetter | A47B 5/02 108/152 |

(Continued)

*Primary Examiner* — Nkeisha Smith
(74) *Attorney, Agent, or Firm* — Amster, Rothstein & Ebenstein LLP

(57) ABSTRACT

A surface extender device includes a first panel having a first front wall and a first rear wall, and a second panel having a second front wall and a second rear wall. The surface extender device also includes a first clamping mechanism mounted to the first front wall of the first panel and configured to secure the first panel to a surface, and a second clamping mechanism mounted to the second front wall of the second panel and configured to secure an object to the second panel. The surface extender device also includes a hinge that connects the first panel to the second panel such that the second panel is rotatable with respect to the first panel. The surface extender device further includes a locking mechanism configured to maintain the second panel at an angle with respect to the first panel.

20 Claims, 5 Drawing Sheets

(56) References Cited

U.S. PATENT DOCUMENTS

| | | | |
|---|---|---|---|
| 3,894,496 A | 7/1975 | Phillips | |
| 3,952,989 A * | 4/1976 | Bannister Hatcher | A47B 23/043 248/444.1 |
| 4,109,889 A * | 8/1978 | Durket | A47B 17/036 108/32 |
| 4,296,524 A * | 10/1981 | Horholt | A63H 33/102 108/64 |
| 4,562,656 A * | 1/1986 | Kristofich | A47G 1/065 16/235 |
| 4,575,149 A * | 3/1986 | Forestal | A47C 7/68 108/135 |
| 4,749,161 A * | 6/1988 | Falcone | B60N 3/005 108/44 |
| 4,852,841 A * | 8/1989 | Sebring | A61G 13/101 24/514 |
| 5,036,777 A | 8/1991 | Barton | |
| 5,074,221 A * | 12/1991 | Lochridge | A47B 17/02 108/6 |
| 5,312,002 A | 5/1994 | DiCicco | |
| 5,317,977 A | 6/1994 | Omessi | |
| 5,568,775 A | 10/1996 | Rizzi | |
| 5,673,631 A | 10/1997 | Guns | |
| 5,876,002 A | 3/1999 | White | |
| 6,015,129 A * | 1/2000 | Harrigan | A47B 23/043 248/444 |
| 6,023,800 A * | 2/2000 | Stickley | A61G 7/0507 248/229.26 |
| 6,276,646 B1 * | 8/2001 | Gaba | A47B 21/0371 108/152 |
| 6,357,703 B1 | 3/2002 | Diorio | |
| 6,412,425 B1 * | 7/2002 | Chen | B60N 3/005 108/44 |
| 6,910,429 B1 | 6/2005 | Matay | |
| 7,003,827 B2 | 2/2006 | DeMayo | |
| 7,017,878 B2 * | 3/2006 | Guo | B60N 3/005 108/42 |
| 7,469,871 B2 * | 12/2008 | Cooper | A47B 31/06 224/276 |
| 7,665,606 B2 | 2/2010 | Gaillard | |
| 7,731,147 B2 * | 6/2010 | Rha | A47B 23/002 248/447 |
| 8,534,635 B2 * | 9/2013 | Yang | F16M 11/10 248/454 |
| 8,584,888 B2 * | 11/2013 | Buerk | B65F 1/141 220/478 |
| 9,089,203 B1 * | 7/2015 | Al-Raqadi | A47B 1/04 |
| 9,320,350 B1 * | 4/2016 | Fryshman | A47B 17/033 |
| 9,469,438 B2 * | 10/2016 | Nool | B65D 25/22 |
| 2002/0171271 A1 * | 11/2002 | Jennings | A47C 7/70 297/188.01 |
| 2006/0016953 A1 * | 1/2006 | Beck | A47B 41/06 248/460 |
| 2014/0319304 A1 * | 10/2014 | Kuan | F16M 11/2021 248/454 |
| 2015/0164221 A1 * | 6/2015 | Zimmerman | A47B 23/02 108/25 |
| 2015/0192245 A1 * | 7/2015 | Hood | F16M 13/06 224/257 |
| 2017/0135468 A1 * | 5/2017 | Johnson | A47B 23/02 |

* cited by examiner

ADJUSTABLE SURFACE EXTENDER

CROSS-REFERENCE TO RELATED APPLICATIONS

The present application claims the priority benefit of U.S. Provisional Patent App. No. 62/382,677 filed on Sep. 1, 2016 and of U.S. Provisional Patent App. No. 62/482,989 filed on Apr. 7, 2017, the entire disclosures of which is incorporated by reference herein. The subject matter of the present application is also related to U.S. Pat. No. 9,320,350, entitled "Portable Surface Extender," the entire disclosure of which is incorporated by reference herein.

FIELD

The current disclosure relates to the field of furniture accessories, more specifically to a novel method and apparatus for securing a device such as a tablet or book at an angle with respect to a desk, table, or other work surface.

BACKGROUND

With the growing number of students in schools and universities, classrooms are becoming more and more crowded, and space is becoming an issue. In some instances, additional classrooms can be built or existing classrooms can be expanded in an effort to reduce crowding and improve the educational experience. However, the expense involved with such construction is often prohibitive. In instances in which expansion is not an option, some institutions have resorted to using smaller desks such that more students can fit into the classrooms.

SUMMARY

A surface extender device includes a first panel having a first front wall and a first rear wall, and a second panel having a second front wall and a second rear wall. The surface extender device also includes a first clamping mechanism mounted to the first front wall of the first panel and configured to secure the first panel to a surface, and a second clamping mechanism mounted to the second front wall of the second panel and configured to secure an object to the second panel. The surface extender device also includes a hinge that connects the first panel to the second panel such that the second panel is rotatable with respect to the first panel. The surface extender device further includes a locking mechanism configured to maintain the second panel at an angle with respect to the first panel.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Embodiments of the present invention will now be described with reference to the above-identified Drawings. However, the Drawings and the description herein are not intended to limit the scope of the claims. It will be understood that various modifications of the present description are possible without departing from the spirit of the invention. Also, features described herein may be omitted, additional features may be included, and/or features described herein may be combined in a manner different from the specific combinations recited herein, all without departing from the spirit of the invention.

The above-discussed trend of utilizing smaller desks due to space considerations results in less desktop space for students to use during class. As a result, it happens often that a student is taking an examination with a test paper occupying an arm rest/desktop, with a calculator balanced on a knee, a coffee cup placed on the floor, etc. Students, among others, therefore are often in need of additional temporary desk space. Described herein is an adjustable surface extender that can be temporarily appended to the surface of a desk or other surface in order to extend the surface thereof. The adjustable surface extender described herein includes two cooperating sections—each having opposing gripping members with a hinge or other mechanism that allows the two sections of the adaptor to move relative to each other. In addition, a temporary securement mechanism is provided to ensure that the two sections of the adjustable surface extender maintain a selected relative orientation until released.

Figure 1:
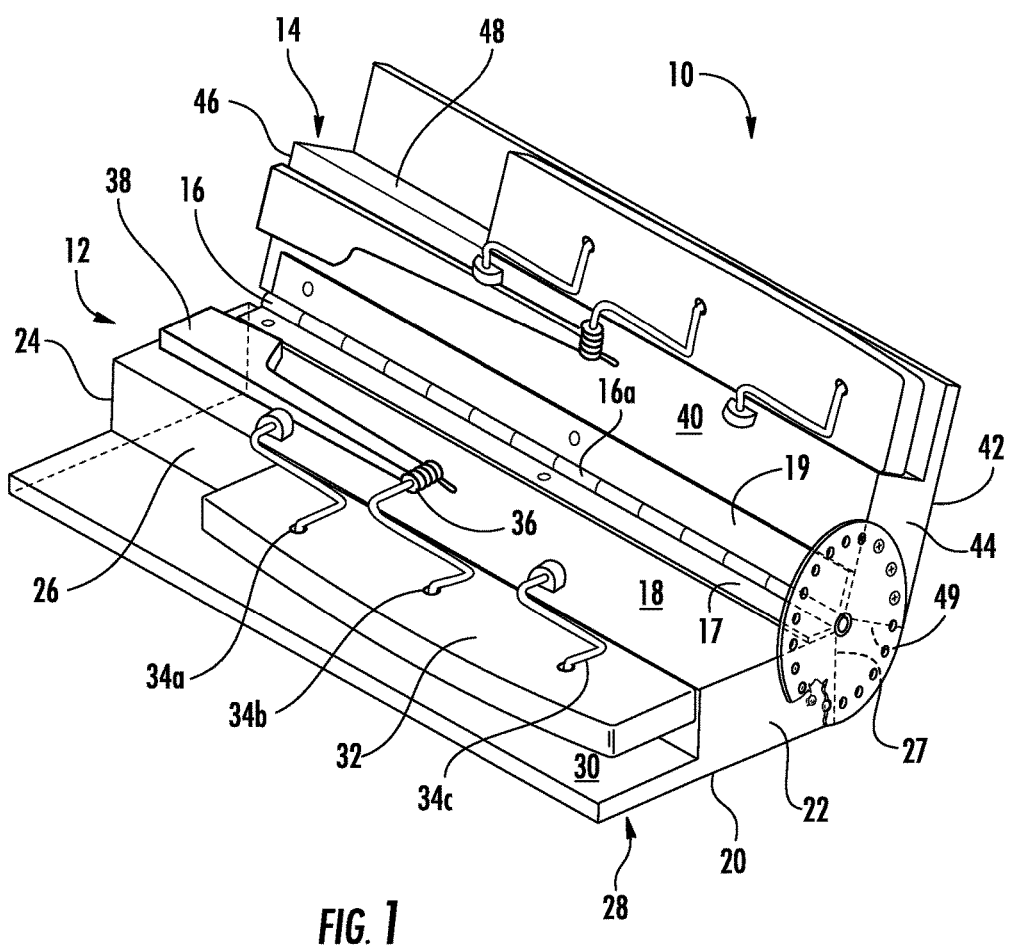
FIG. 1 is a top, perspective view of an adjustable extender device showing the second panel angled upwardly in accordance with an illustrative embodiment.

FIG. 1 shows an adjustable surface extender device 10 having a first panel 12, a second panel 14, and a hinge 16 disposed between the first and second panels 12, 14, allowing for relative movement with respect to one another in accordance with an illustrative embodiment. The hinge 16 can be a single hinge or a plurality of hinges, depending on the implementation.

As depicted in FIG. 1, first panel 12 has a top wall 18, a bottom wall 20, a first side wall 22, and a second side wall 24. First and second side walls 22, 24 define the thickness of first panel 12. A front wall 26 of the surface extender has a clamping mechanism disposed substantially adjacent thereto. A rear wall 27 is disposed the substantially parallel to front wall 26.

In an illustrative embodiment, a clamping mechanism used to grip a surface is formed by a lower lip 28 and a movable clamping arm 32. For example, as shown, lower lip 28 extends from front surface 26 of first panel 12. Lower lip 28, which is disposed substantially orthogonally to front surface 26, has an upper surface 30 that is configured to contact an underside surface of a desktop or similar surface. Movable clamping arm 32 is disposed above and substantially parallel to lower lip 28. As shown in FIG. 1, movable clamping arm 32 is a spring biased clamping device that is configured to contact an upper surface of a desktop. For example, as shown, movable clamping arm 32 is movably connected to top surface 18 of first panel 12. As illustrated, each of a plurality of bent arms 34a, 34b, 34c have a first end that is pivotably mounted to top surface 18 of first panel 12 and a second end that is attached to the movable clamping arm 32. At least one of bent arms (e.g., the center bent arm 34b shown in FIG. 1) is surrounded by a spring 36. A handle 38 is attached to the distal end of the spring 36. Handle 38 serves as the interface for lowering and raising movable clamping arm 32. When handle 38 is rotated in a first direction, bent arm 34b (and the other bent arms) pivots downwardly—thereby lowering movable clamping arm 32, whereas, when handle 38 is rotated in a second direction, bent arms 34a, 34b, 34c pivot in a second direction to raise movable clamping arm 32.

When movable clamping arm 32 is lowered as described above, it stops when it comes into contact with a surface to be gripped. Handle 38, so positioned, applies tension to spring 36, which translates to force being applied to movable clamping arm 32, and thus to the surface to be gripped (e.g., a desktop). As a result, the clamping device shown in FIG. 1 may be used to clamp and grip surfaces of varying thicknesses.

In another illustrative embodiment, movable clamping arm 32 is positioned above and substantially parallel to lower lip 28. The space defined between lower lip 28 and movable clamping arm 32 is somewhat wider than the thickness of an average-sized desktop. In the embodiment shown, during use, movable clamping arm 32 contacts a top surface of a desktop or tabletop, whereas lower lip 28 contacts an underside surface of such desktop or tabletop.

Still referring to FIG. 1, second panel 14 is shown hingedly joined to first panel 12 by way of hinge 16. In an illustrative embodiment, second panel 14 may be of similar size and shape as first panel 12, but it need not be. For example, in one embodiment, first panel 12 may be significantly smaller than second panel 14, or vice versa. As shown, second panel 14 has a top surface 40, a bottom surface 42, a first side surface 44, and a second side surface 46. First and second side surfaces 44, 46 define the thickness of second panel 14. A front surface 48 of second panel 14 has a second clamping mechanism disposed substantially adjacent thereto. The clamping mechanism of second panel 14 may be of the same type as disposed on first panel 12 (as shown in FIG. 1), or it may be of a different type. It will be understood by those of ordinary skill in the art that any of various gripping members may be utilized on first and second panels 12, 14 in embodiments of the invention. For example, any of various tensioning clamps or other such similar devices used to join, grip or compress structural parts may be employed to grip a desk or similar surface in embodiments of the invention. It will be further understood that in embodiments of the invention a clamping mechanism may extend from a front wall of a panel, it may from a top and bottom surface of a panel and extend past the front wall, or a combination of both.

As discussed above, first panel 12 is joined to second panel 14 by way of hinge 16, which may be one or more hinges. For example, as shown, hinge 16 includes a first leaf 17 affixed to upper wall 18 of first panel 12 and a second leaf 19 affixed to upper wall 40 of second panel 14, the combination of which joins first panel 12 to second panel 14. In an illustrative embodiment, a hinge knuckle 16a of hinge 16 faces upward. This configuration allows for second panel 14 to be rotated with respect to first panel 12. In an alternative embodiment, hinge knuckle 16a may face downward in the orientation depicted in FIG. 1. Hinge 16 can be a standard door hinge, a piano hinge, a butt hinge, a T-hinge, a strap hinge, a soss hinge, or any other type of hinge known to those of skill in the art. Alternatively, as discussed in more detail below, hinge 16 may be a living hinge or other type of hinge formed through the use of semi-rigid materials.

Figure 2:
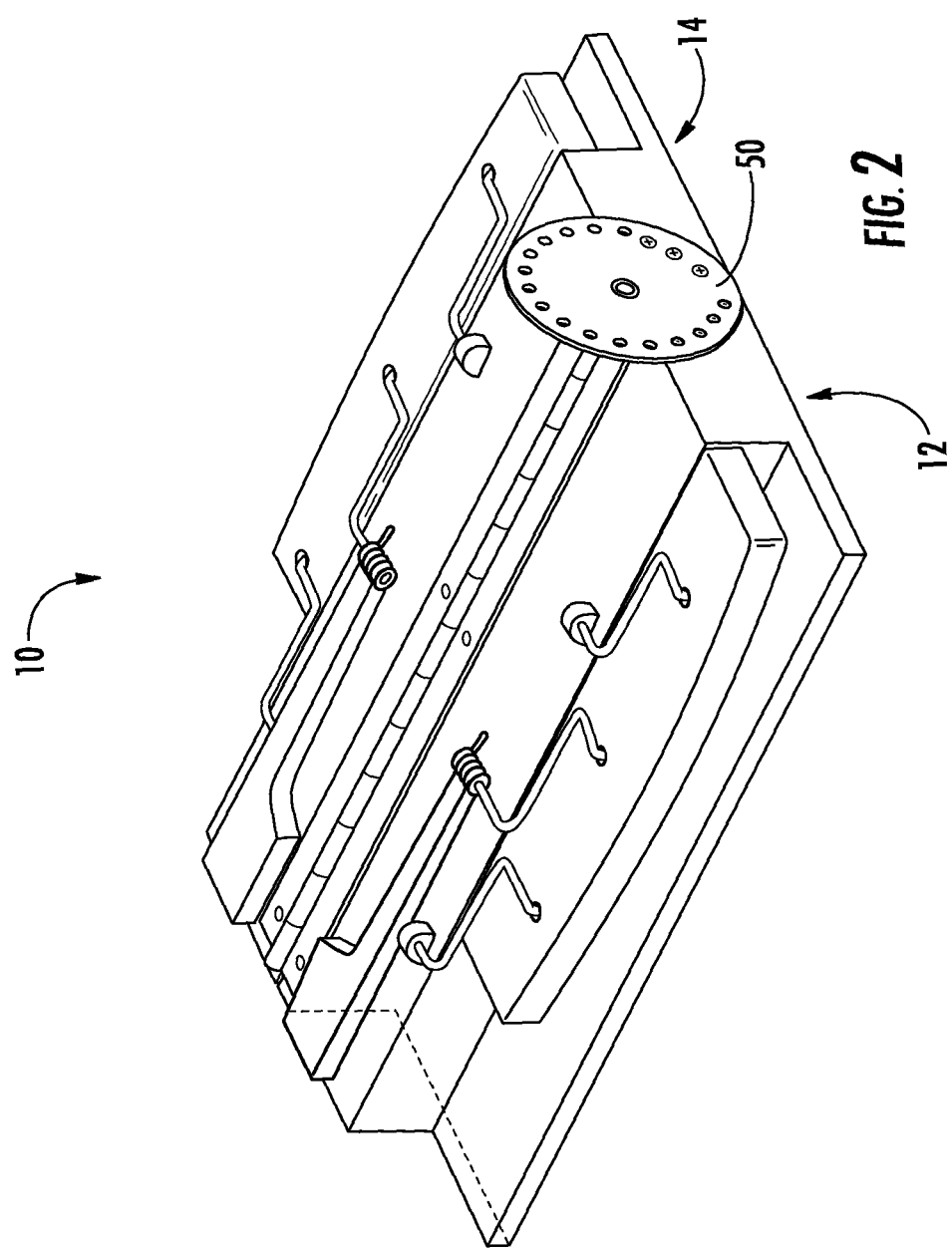
FIG. 2 is a top, perspective view of the adjustable extender device of FIG. 1 where the two panels are shown in a substantially co-planar position in accordance with an illustrative embodiment.

Referring to FIG. 2 in accordance with an illustrative embodiment, first panel 12 is shown substantially coplanar with second panel 14, whereby respective rear walls 27, 49 of first and second panels 12, 14 are positioned substantially parallel to one another and respective top walls 18, 40 of panel 12, 14 are maintained in a substantially co-planar position. In the fully extended, substantially coplanar orientation depicted in FIG. 2, rear wall 49 of second panel 14 contacts and rests on rear wall 27 of first panel 12 and respective clamping mechanism on first panel 12 and second paned face opposite directions. In some embodiments, second panel 14 is rotatable by at least 90° about the axis of hinge knuckle 16a from a planar orientation to at least a 90° angle with respect to first panel 12. In an alternative embodiment, second panel 14 may be free to rotate such that second panel 14 is at any desired angle relative to first panel 12.

Figure 3:
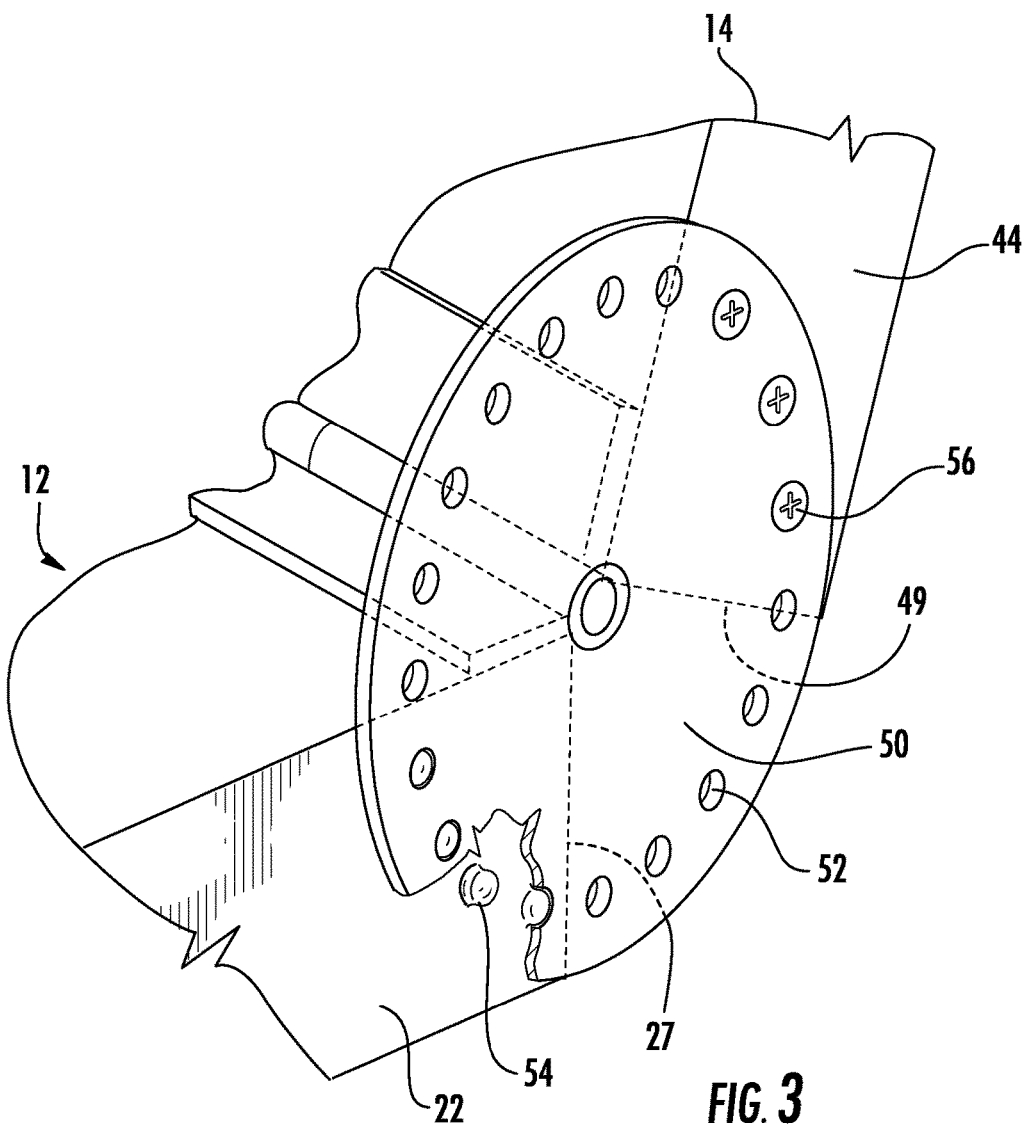
FIG. 3 is an enlarged view of an incremental locking mechanism provided on the adjustable extender device of FIGS. 1 and 2 in accordance with an illustrative embodiment.

In an illustrative embodiment, adjustable surface extender device 10 is provided with a temporary locking mechanism to maintain second panel 14 at any of a plurality of various user desired angles. For example, FIG. 3 shows an enlarged view of an incremental locking mechanism that includes a wheel 50 having a series of apertures 52 disposed around an outer segment thereof. As shown, a projection 54 is provided extending outwardly from side wall 22 of first panel 12. The projection 54 is substantially sized and shaped to insert into any of apertures 52. Although a single projection 54 is depicted in FIG. 3, a plurality of projections may be used in alternative embodiments. In one embodiment, wheel 50 is affixed to side wall 44 of second panel 14, for example, by way of one or more screws 56. In use, second panel 14 is rotatable with respect to the first panel, whereby such rotation may be stopped at any of various incremental positions where projection 54 inserts into a corresponding aperture 52.

Figure 4:
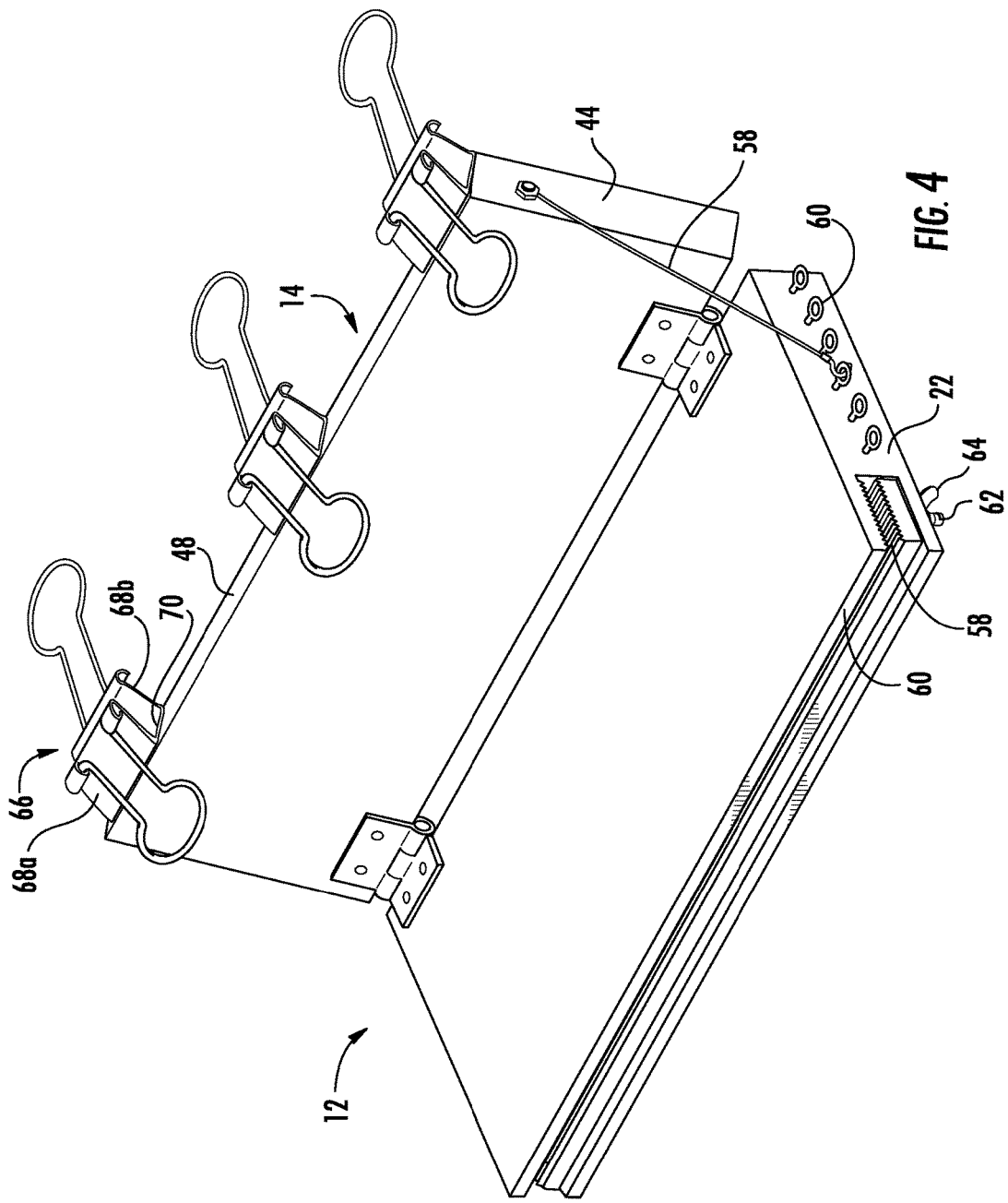
FIG. 4 is a top, perspective view of an adjustable extender device showing the second panel angled upwardly in accordance with an illustrative embodiment.

It will be understood by those of ordinary skill in the art that any of various different incremental locking mechanisms may be utilized to maintain second panel 14 at any of various angles with respect to the first panel 12. For example, FIG. 4 shows a hook 58 mounted to the side wall 44 of second panel 14. Also shown are a series of eyes 60 that are secured to side wall 22 of first panel 12. In an illustrative embodiment, hook 58 is insertable into any of the various eyes 60 mounted on side surface 22 of first panel 12. The hook 58 so inserted into an eye 60 serves as a barrier against rotation of the second panel 14 to the coplanar direction, and is used to maintain second panel 14 at a desired angle. In an alternative embodiment, instead of a hook and eyes, a different incremental locking mechanism may be used such as one or more tension adjustable hinges or lockable hinges that allow second panel 14 to maintain an angle relative to first panel 12.

In an illustrative embodiment, one panel of the adjustable surface extender device is provided with a first clamping mechanism that is configured to selectively attach to a desktop or other surface to be extended, whereas, a second panel is provided with a second clamping mechanism that is configured to selectively attach to a sheet of paper, a book, a tablet computer, or similar device. Thus, in some embodiments, the first clamping mechanism provided on the first panel 12 may be of the same type as the second clamping mechanism on second panel 14. In other embodiments, first panel 12 is provided with a clamping mechanism of a first type and second panel 14 is provided with a clamping mechanism of a second type.

For example, still referring to FIG. 4, first panel 12 is provided with a clamping mechanism comprising a tongue 58 that is movable in an upward direction. An upper lip 60 is disposed above and substantially parallel to tongue 58. As shown, a screw 62 is affixed to a lower side of tongue 58 such that rotation of a cooperating wing nut 64 in a first direction urges screw 62 and associated tongue 58 in an upward direction, whereas, rotation of wing nut 64 in a second direction causes screw 62 and associated tongue 58 to move in a downward direction.

As depicted in FIG. 4, second panel 14 is provided with a plurality of gripping members that are of a different type from that included on first panel 12. For example, as shown, the plurality of gripping members are binder clips 66 affixed to front wall 48 of second panel 14. In alternative embodiments, fewer or additional binder clips may be used. In other embodiments, gripping members other than binder clips can also be used.

In an illustrative embodiment, binder clips 66 are of the variety conventionally used for binding stacks of paper. Binder clips 66 are shown having two gripping arms 68*a*, 68*b*. The gripping arms 68*a*, 68*b* are joined by a backing 70 which bridges the gripping arms 68*a*, 68*b* together. Gripping arms 68*a*, 68*b* angle downwardly as they extend from the backing 70 and in the default position the distal tips of the gripping arms 68*a*, 68*b* contact one another. As such, when the distal tips are pulled apart they are biased toward the default (closed) position and accordingly they provide a strong grip on an object placed therebetween. In the embodiment shown in FIG. 4, three binder clips 66 are shown attached to second panel 14. A user may, as such, use all binder clips 66 to grip a single object, or alternatively, a user may insert three separate items (e.g. cards) into each of the binder clips 66.

Figure 5:
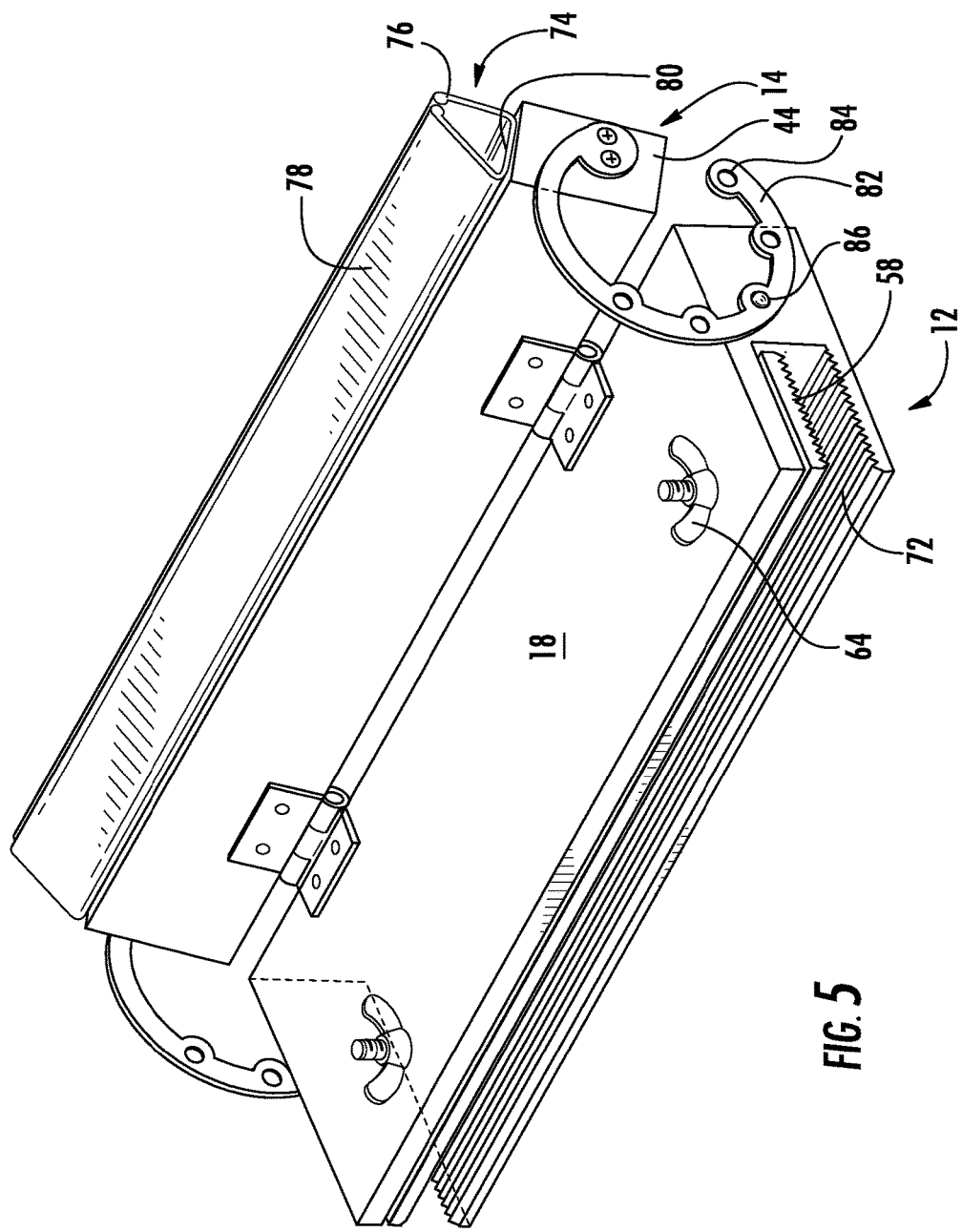
FIG. 5 is a top, perspective view of an adjustable extender device showing the second panel angled upwardly in accordance with an illustrative embodiment.

FIG. 5 shows yet another illustrative embodiment of the adjustable surface extender device in which first panel 12 is provided with a tongue 58 and screw clamping mechanism similar to that described with respect to FIG. 4. In the embodiment shown in FIG. 5, wing nuts 64 are shown attached to threaded rods positioned on top wall 18 of first panel 12 such that wing nuts 64 are easily accessible to a user to secure the extender device to a desktop or other surface. For example, as shown, rotation of wing nut 64 in a first direction along the threaded rod causes tongue 58 to be lowered in order to grasp a desktop or tabletop between tongue 58 and lower lip 72. Similarly, rotation of wing nut 64 in a second direction along the threaded rod causes tongue 58 to be raised.

In an illustrative embodiment, second panel 14 is provided with a slot-type clamping device. For example, as shown, a substantially "U-shaped" channel 74 is provided on the front wall of second panel 14. Channel 74 is formed of a first clamping wall 76 and a second clamping wall 78 that are bridged by a bridging wall 80. Terminal ends of first and second clamping walls 76, 78 are biased toward one another. A user may, as such, insert thin items such as sheets of paper, small books, smart phones, or tablet computers between first and second clamping walls 76, 78 of channel 74. In one embodiment, the slot-type clamping device of FIG. 5 can include a handle, for example on one of first clamping wall 76 and second clamping wall 78, such that a user can spread the biased terminal ends apart to receive an item.

FIG. 5 shows a temporary securement mechanism whereby a slotted ring 82 is mounted to first side surface 44 of second panel 14. Slotted ring 82 has a plurality of holes 84 at given increments that are sized and shaped to capture a projection 86 extending from first side wall 22 of first panel 12. Second panel 14 may be rotated in either direction until projection 86 inserts into a desired hole 84 on slotted ring 82. In embodiments of the invention, a ring having a continuous track (rather than a series of holes) may be used as a temporary securement mechanism (not shown).

It will be understood by those of ordinary skill in the art that any of various hinges may be used to hingedly connect first panel 12 to second panel 14. For example, a slender piece of leather or soft plastic may be used as a hinge. Alternatively a (flexure bearing) living hinge made from the same material as the two panels it connects (e.g., plastic). The living hinge is an area between the panels that is thinned or cut to allow the rigid panels to bend along the line of the hinge.

In one embodiment, an adjustable surface extender device is formed of a unitary panel, rather than two hinged panels. For example, in some embodiments an adjustable surface extender device is formed of a panel made of flexible material such as flexible plastic, PVC or the like. A first clamping mechanism is provided on a first front wall of the panel, and second, opposing clamping mechanism is provided on an opposing wall. The first clamping mechanism is configured to grasp a desktop surface, and once so installed, the panel may assume any of various desired angles by simply bending the material. In some embodiments, a temporary securement mechanism, for example as described herein, is provided to secure the adjustable extender in a desired angle. In other embodiments, however, a unitary panel is formed of or incorporates gooseneck tubing or any such similar stayput or obedient tubing. In these embodiments, the panel need only be bent to a desired angle and the material will retain the desired angle.

The adjustable extender device according to embodiments described herein will make it possible to keep a book or screen or other surface open at the end of the desk or other surface, facing the user, and leaving the desk available for another user. Furthermore, devices according to embodiments described herein will enable people sitting in rows to mount, temporarily, reading material, screens, or any other laminated material without disturbing the person in front. In some embodiments, as described herein, a second panel of an adjustable surface extender device may be fixed at a given angle with respect to a first panel. In these embodiments, there is a permanent lock securing the first and second panels together.

Having described the subject matter of the application with regard to specific embodiments, it is to be understood that the description is not meant as a limitation since further modifications and variations may be apparent or may suggest themselves to those skilled in the art. It is intended that the present application cover all such modifications and variations.

What is claimed is:

1. A surface extender device, comprising:
 a first panel having a first front wall and a first rear wall;
 a second panel having a second front wall and a second rear wall;
 a first clamping mechanism comprising a movable clamping arm and a contacting arm disposed substantially parallel to the movable clamping arm, the movable clamping arm and the contacting arm mounted substantially adjacent to the first front wall of the first panel and configured to grip a surface between the movable clamping arm and the contacting arm to secure the first panel to the surface;

a second clamping mechanism comprising a movable clamping arm and a contacting surface disposed substantially parallel to the movable clamping arm, the movable clamping arm and the contacting arm mounted substantially adjacent to the second front wall of the second panel and configured grip an object between the movable clamping arm and the contacting arm to secure the object to the second panel;

a hinge that connects the first panel to the second panel such that the second panel is rotatable with respect to the first panel, whereby when the first panel and second panel are positioned in a substantially co-planar orientation, the first and second clamping mechanisms face substantially opposite directions;

whereby, when the first clamping mechanism is used to grip a surface and the second clamping mechanism is used to grip an object, the second panel is rotatable while the object is gripped by the second clamping mechanism; and a locking mechanism configured to maintain the second panel at any of a plurality of user desired angles with respect to the first panel.

2. The surface extender device of claim 1, wherein the movable clamping arm of the first clamping mechanism is configured to contact a top surface of a surface that is to be extended.

3. The surface extender device of claim 1, wherein the first clamping mechanism comprises a lower lip.

4. The surface extender device of claim 1, wherein the movable clamping arm of the first clamping mechanism is spring biased.

5. The surface extender device of claim 1, further comprising a handle and a spring, wherein the handle is configured to apply tension to the spring, which translates to a force applied to the movable clamping arm.

6. The surface extender device of claim 5, wherein the first clamping mechanism further includes a bent arm, wherein a first end of the bent arm is pivotably mounted to a top surface of the first panel and a second end of the bent arm is mounted to the movable clamping arm.

7. The surface extender device of claim 6, wherein the first clamping mechanism comprises a plurality of bent arms.

8. The surface extender device of claim 1, wherein the first clamping mechanism comprises an adjustable tongue.

9. The surface extender device of claim 8, further comprising a threaded rod and a wing nut on the threaded rod, wherein rotation of the wing nut is configured to move the adjustable tongue.

10. The surface extender device of claim 1, wherein the hinge comprises a living hinge.

11. The surface extender device of claim 1, wherein the second clamping mechanism comprises one or more grippers.

12. The surface extender device of claim 11, wherein the one or more grippers comprise one or more binder clips.

13. The surface extender device of claim 1, wherein the second clamping mechanism includes a first clamping wall, a second clamping wall, and a bridging wall that connects the first clamping wall and the second clamping wall to form a channel.

14. The surface extender device of claim 13, wherein a first terminal end of the first clamping wall and a second terminal end of the second clamping wall are biased toward one another.

15. The surface extender device of claim 1, wherein the hinge comprises a living hinge that is made from a same type of material that is used to form the first panel and the second panel.

16. The surface extender device of claim 15, wherein the living hinge comprises an area between the first panel and the second panel that is thinned or cut to allow the second panel to move relative to the first panel.

17. The surface extender device of claim 1, wherein the locking mechanism comprises a hook and one or more apertures into which a first end of the hook can be inserted to maintain the second panel at the angle with respect to the first panel.

18. The surface extender device of claim 17, wherein a second end of the hook is mounted to one of the first panel and the second panel, and wherein the one or more apertures are in the form of one or more eyes mounted to the other of the first panel and the second panel.

19. The surface extender device of claim 1, wherein the locking mechanism comprises a wheel that includes a plurality of apertures, wherein the wheel is mounted to one of the first panel and the second panel.

20. The surface extender device of claim 19, wherein the locking mechanism further comprises a projection mounted on the other of the first panel and the second panel, wherein the projection is configured to fit into an aperture of the wheel to maintain the second panel at the angle with respect to the first panel.

* * * * *